United States Patent
Kalkbrenner et al.

(10) Patent No.: US 10,649,194 B2
(45) Date of Patent: May 12, 2020

(54) IMMERSION APPARATUS AND METHOD FOR DYNAMICALLY ADAPTING A MEDIUM TO A SPECIMEN

(71) Applicant: Carl Zeiss Microscopy GmbH, Jena (DE)

(72) Inventors: Thomas Kalkbrenner, Jena (DE); Sebastian Borck, Jena (DE); Jörg Siebenmorgen, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/142,979

(22) Filed: Sep. 26, 2018

(65) Prior Publication Data
US 2019/0101740 A1  Apr. 4, 2019

(30) Foreign Application Priority Data
Sep. 29, 2017  (DE) .................. 10 2017 217 380

(51) Int. Cl.
| | |
|---|---|
| *G02B 21/33* | (2006.01) |
| *G02B 21/36* | (2006.01) |
| *G05D 11/02* | (2006.01) |
| *G06T 7/00* | (2017.01) |
| *H04N 5/232* | (2006.01) |

(52) U.S. Cl.
CPC .......... *G02B 21/33* (2013.01); *G02B 21/365* (2013.01); *G05D 11/02* (2013.01); *G06T 7/0014* (2013.01);
(Continued)

(58) Field of Classification Search
CPC ...... G02B 21/33; G02B 21/365; G02B 21/02; G02B 21/34; G05D 11/02; G06T 7/0014;
(Continued)

(56) References Cited

U.S. PATENT DOCUMENTS

| | | | | |
|---|---|---|---|---|
| 2009/0135385 A1* | 5/2009 | Gellrich | .............. | G03F 7/70891 355/30 |
| 2018/0313863 A1* | 11/2018 | Donat | ..................... | G01N 1/312 |
| 2019/0094512 A1* | 3/2019 | Ohrt | ...................... | G01N 21/15 |

FOREIGN PATENT DOCUMENTS

| | | |
|---|---|---|
| DE | 102004015587 A1 | 11/2004 |
| DE | 102006026852 A1 | 12/2007 |

(Continued)

OTHER PUBLICATIONS

Kanjar De, et al.; "Image Sharpness Measure for Blurred Images in Frequency Domain"; Procedia Engineering 2013; 64:149-158.
(Continued)

*Primary Examiner* — Fernando Alcon
(74) *Attorney, Agent, or Firm* — Duane Morris LLP (57) ABSTRACT

An arrangement and method for supplying immersion media and a method for setting optical parameters of a medium, includes a media supply unit for the controlled supply of a medium or of a mixture into a contact region between an optical lens and a specimen slide, on which a specimen may be arranged. An image capture unit is provided for capturing image data on the basis of detection radiation from the object space along a detection beam path extending through the contact region. An evaluation unit is provided to establish current image parameters on the basis of captured image data, to compare said current image parameters to intended image parameters and to establish a desired mixing ratio of at least two components of the medium depending on the comparison. A mixing apparatus for the controlled setting of the mixing ratio of the components of the medium to be introduced into the contact region and a control unit for actuating the mixing apparatus depending on the established desired mixing ratio are parts of the arrangement.

10 Claims, 5 Drawing Sheets

(52) U.S. Cl.
CPC ... *H04N 5/232* (2013.01); *G06T 2207/10056* (2013.01); *G06T 2207/30024* (2013.01); *G06T 2207/30168* (2013.01)

(58) Field of Classification Search
CPC . G06T 2207/10056; G06T 2207/30024; G06T 2207/30168; H04N 5/232; G01N 1/38; G01N 21/01; G01N 21/41; G01N 21/64; G01N 21/84
See application file for complete search history.

(56) References Cited

FOREIGN PATENT DOCUMENTS

| DE | 102006027609 A1 | 12/2007 |
|----|-----------------|---------|
| DE | 102015221044 A1 | 5/2017  |

OTHER PUBLICATIONS

Hell, S., et al.; "Aberrations in confocal fluorescence microscopy induced by mismatches in refractive index"; Journal of Microsopy 1993; 169(3):391-405.

Herraez, Jose V., et al.; "Refractive Indices, Densities and Excess Molar Volumes of Monoalcohols + Water"; Journal of Solution Chemistry 2006; 35:1315-1328.

Liu, P.Y., et al.; "Cell refractive index for cell biology and disease diagnosis: past, present and future"; Lab on a Chip 2016; 16:634-644.

Peli, Eli; "Contrast in complex images"; Journal of the Optical Society of America 1990; 7(10):2032-2040.

Zhang, Nien Fan, et al.; "Image Sharpness Measurement in the Scanning Electron Microscope—Part III"; Scanning 1999; 21:246-252.

German Search Report dated Jun. 7, 2018.

\* cited by examiner

IMMERSION APPARATUS AND METHOD FOR DYNAMICALLY ADAPTING A MEDIUM TO A SPECIMEN

RELATED APPLICATIONS

The present application claims priority benefit of German Application No. DE 10 2017 217 380.7 filed on Sep. 29, 2017, the contents of which is incorporated by reference in its entirety.

FIELD OF THE INVENTION

The invention relates to an arrangement and a method for setting the optical properties of a medium, in particular of an immersion medium, and to a microscope having such an arrangement.

BACKGROUND OF THE INVENTION

Particularly in live cell microscopy, the exact refractive index of the specimen is usually unknown. This relates not (only) to the embedding medium and/or an employed buffer but, in particular, to the interior of the specimen, which may be provided, for example, by cells, (tumour) spheroids, tissue slices or entire organisms.

Since these specimens are usually stored and examined in aqueous solutions (buffer solutions), and for historical reasons, water immersion objectives are usually used. These are optimized for a refractive index of n=1.33 (refractive index of water). However, the refractive index of living cell specimens deviates from n=1.33 (see, e.g., Liu, P. Y., et al. "Cell refractive index for cell biology and disease diagnosis: past, present and future." Lab on a Chip 16.4 (2016): 634-644).

Thus, for example, the refractive index of the cytosol of typical cells lies in the range of 1.36-1.39 and therefore deviates significantly from the refractive index of water. A maladjustment of optical arrangements resulting therefrom leads to aberrations which restrict the optical power of the microscope. A compensation of these aberrations, if at all possible, is complicated and expensive and can be brought about, for example, by means of adaptive optical units, e.g., deformable mirrors.

This applies, in particular, to light sheet systems, which have at least one optical axis that is not perpendicular to a coverslip. The coverslip, which may also be formed by the base of a specimen holder, for example a Petri dish, a (micro-)titration plate or a transparent plate in the case of inverted microscopy, is passed through at an angle not equal to 90°, i.e., passed through obliquely, by detection radiation to be captured.

When errors occur in the adaptation of the refractive index, non-symmetrical aberrations such as astigmatism or coma often arise. However, these are even less tolerable than symmetrical aberrations which may occur in the case of conventional arrangements with reflected light and which appear, in particular, as spherical aberrations. Although such symmetric errors are initially more easily tolerable by the user, they ultimately nevertheless lead to significant restriction, for example in the optical penetration depth of the microscope.

Suitable immersion media can be used for reducing aberrations that are caused during a passage of an illumination radiation and/or detection radiation through a specimen.

Conventional immersion media include, for example, water, silicone oil and immersion oils that are used together with a correspondingly embodied immersion objective. In microscopy, the use of immersion objectives offers many advantages, which all ultimately arise from the higher obtainable numerical apertures of the objectives. These advantages include, for example, a higher spatial resolution, a higher light collection efficiency, an improved signal-to-noise or signal-to-background ratio, shorter exposure times and a better temporal resolution and reduced phototoxicity.

Since the specimens can be embedded and affixed differently, there are different classes of immersion media for working as closely as possible to the refractive index of the specimen. Typical immersion media include water, organic substitute media for water (e.g., ZEISS Immersol W), glycerol (e.g., ZEISS Immersol G) and special immersion oils (e.g., ZEISS Immersol F, Immersol HI). All these immersion media are liquid at room temperatures. Ideal image quality, maximum signal intensity and maximum penetration depth are only obtained if the immersion medium has exactly the same optical parameters as the specimen (cf., Hell, S., et al. (1993): Aberrations in confocal fluorescence microscopy induced by mismatches in refractive index. Journal of microscopy, 169: 391-405).

In principle, the numerical aperture can be maximized by using immersion media with a refractive index that is as high as possible, with an expedient upper limit being given by the refractive index of the coverslip. The coverslip is no longer optically effective in the case of a perfectly adapted refractive index ($n_{immersion} = n_{coverslip}$). Such a situation, which is typically obtained in the case of oil immersion objectives, is illustrated schematically in FIG. 1a.

Figure 1A:
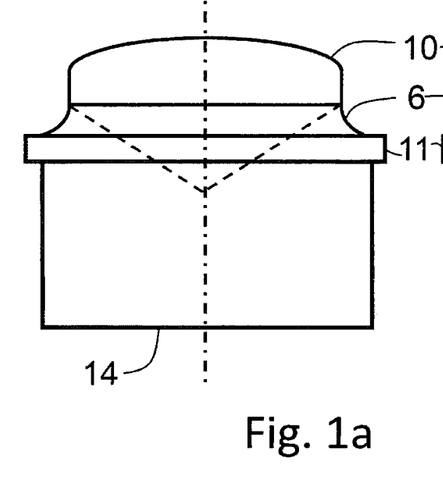
FIG. 1a is a schematic illustration of the prior art of an objective in the form of an immersion objective, a coverslip and a specimen, wherein a medium in the form of an immersion medium is situated between objective and coverslip, wherein the refractive indices are ideally matched to one another.

A specimen 14, a specimen holder 11 in the form of a coverslip and an objective 10 and also an immersion medium 6 between specimen holder 11 and objective 10 are illustrated. The profile of focussed illumination radiation is illustrated in a simplified manner as an interrupted solid line.

A case often occurring in the case of biological specimens is that the refractive index of the specimen medium deviates from that of the coverslip 11 and the immersion. In this situation, ideal work can only be carried out relatively close to the coverslip surface when using oil immersion objectives. The reason for this lies in the fact that aberrations, in particular spherical aberrations, occur as a result of the refractive index jump, said aberrations becoming ever stronger with increasing penetration into the specimen 14. Therefore, water immersion objectives (FIGS. 1b and 1c) are better suited to microscopy of living cells, in particular. Since the cells are in an aqueous solution, the refractive indices of immersion liquid and specimen medium are very similar; there is only a deviation of the coverslip 11 itself. If the objective has been optically corrected, no spherical aberrations occur in the case of relatively deep penetration into the specimen 14 (FIG. 1c). However, this correction only works for a known and specified coverslip thickness and glass type. Therefore, water immersion objectives usually have a correction function, by means of which unavoidable coverslip thickness variations, as indicated by the double-headed arrow (FIGS. 1b and 1c), can be corrected by displacing a lens or lens group in the objective 10 (correction ring, "Corr ring").

OBJECT OF THE INVENTION

The invention should solve the problem of the restriction of the microscopic imaging using immersion objectives due to maladjustment between the refractive index of the immersion medium and the refractive index of the specimen, in particular for live cell microscopy.

In respect of an arrangement, the object is achieved by the subject matter of Claim 1 and, in respect of a method, the object is achieved by the subject matter of Claim 5. Advantageous developments are specified in the dependent claims.

SUMMARY OF THE INVENTION

The arrangement for supplying media that serve as immersion media has a media supply unit for the controlled supply of a medium or of a mixture into a contact region between an optical lens and, as an object to be observed, a specimen that is arranged or arrangeable in an object space. In particular, the contact region is formed between an optical lens and a specimen slide, on which the specimen is arranged or arrangeable in the object space. Furthermore, an image capture unit is present for capturing image data on the basis of detection radiation obtained from the object space along a detection beam path extending through the contact region.

According to the invention, the arrangement has an evaluation unit, said evaluation unit being configured to establish current image parameters on the basis of captured image data and to compare said current image parameters to intended image parameters. A desired mixing ratio of at least two components of the medium is established depending on the result of the comparison. A mixing apparatus is present for the controlled setting of the mixing ratio of the components of the medium to be introduced into the contact region. Moreover, a control unit is present, said control unit being embodied to actuate the media mixing apparatus depending on the established desired mixing ratio.

Preferably, the evaluation unit is provided with a feedback loop such that the effects of currently undertaken changes in the mixing ratios can be captured, checked and corrected where necessary. Sensors may be present for capturing a currently set mixing ratio of the components. By way of example, a refractometer can be used for monitoring the mixing ratio.

The medium that should serve as an immersion medium must contain two miscible components. The components must be miscible at least over a range of their proportions. In order to ensure good miscibility and conveyability, the components should not be highly viscous. In particular cases, it may be possible to set mixing ratios in which one of the components is contained in the medium with a proportion of zero.

The invention therefore relates to controllable and, optionally, dynamic mixing of at least two suitable components $K_1$ and $K_2$, the refractive indices of which differ. Below, the refractive indices are denoted $n_1$, $n_2$, . . . , $n_i$ for a first component $K_1$, a second component $K_2$, . . . , an i-th component $K_i$ of the medium. The mixing ratios of the components of the medium are adapted to the current requirements of the employed microscopy method and/or to changing ambient conditions. Thus, an option is proposed for continuously adapting the refractive index of an element of a microscopy arrangement, for example, to current and/or changing conditions.

Ideally, $n_1$ and $n_i$ include the possible range of the refractive index for the application of the microscope system or delimit a partial range. Examples include, for example, $n_1=1.33$ and $n_i=1.4$ for live cell microscopy, $n_1=1.33$ and $n_i=1.52$ for live cell microscopy and affixed cells, $n_1=1.36$ and $n_i=1.42$ for live cell microscopy and affixed cells when using embedding media that are suitable for glycerol immersion. The range of the refractive index can also be $n_i=1.52$ to 1.56, as is present, for example, in the case of a few clearing solutions. By mixing the two components with a suitable volume ratio, it is possible to set a resultant refractive index $n_{res}$ between these thresholds. Here, it should be noted that the direct ratio of the volume fractions $$n_{res}=(n_1*V_1+n_2*V_2)/(V_1+V_2)$$

only approximately yields the refractive index $n_{res}$ of a binary mixture. Better values emerge, for example, from the Lorentz-Lorenz equation or the Gladstone-Dale equation, which also takes account of the density of the liquids (references in: Herraez, J. V. and Belda, R. (2006): Refractive indices, densities and excess molar volumes of monoalcohols+water. Journal of solution chemistry 35: 1315-1328).

Examples of suitable components and media are water-alcohol mixtures and various alcohols (see likewise: Herraez, J. V. and Belda, R.).

In the case of a defined field of use and known properties of the components $K_1$ and $K_2$, the refractive index of the respective mixtures can also be determined once by empirical means and can be stored as a table. However since the current refractive index of the specimen to be examined, i.e., for example, the interior of a specific type of living cell, is not known in advance, such a mixture should initially only predetermine a plausible starting value. An adaptation of the refractive index that is as optimized as possible is achieved and occurring aberrations are largely reduced by a slight variation of the mixing ratio.

The mixing apparatus may comprise a pump, lines, storage containers for the components of the medium to be mixed, and, optionally, mixing lines or mixing chambers.

The components can be mixed externally in a mixing chamber. The medium is then actively conveyed from the mixing chamber to the contact region, or it flows there on account of gravity (passively).

In further embodiments, the components are mixed in a mixing line on the path between storage container and contact region. It is also possible to directly mix the two components in the contact region; this is advantageous, in particular, if cost-intensive components are used.

The components can be mixed passively with the aid of a turbulent flow. To this end, turbulators can be present in the media supply lines, by means of which a laminar flow is avoided or eliminated at least locally and converted into a turbulent flow. Furthermore, it is possible to exploit the so-called Dean effect in Dean flow mixers.

Microfluidic elements can also be used. The advantages thereof come to bear if use should only be made of small liquid volumes or if the contact region is very small and/or a cost-intensive medium is used and unused volume in supply lines should be minimized. The use of microfluidic elements is likewise possible if a fast change in the refractive index of the medium is sought after.

Active mixing can be brought about, for example, with the aid of stirrer systems, magnetic stirrers, combined mixing-pumping systems and/or sawtooth dispersers.

For the purposes of the efficient use of the apparatus according to the invention and a likewise effective and precise implementation of the method described further below, the removal of the medium is also of importance, particularly for adapting the refractive index of the immersion as a function of image quality parameters.

In order to achieve an effective supply and/or removal of the medium into, or from, the contact region, the arrangement can comprise an optical lens, which has at least one channel opening at the contact region. Here, the channel extends through the optical lens.

The optical lens comprises a first lens surface and a second lens surface, wherein the first lens surface faces the specimen to be observed and the second lens surface faces away from the specimen to be observed. The one channel or at least one of the channels present can, in a further embodiment of the optical lens, open up away from a highest point of the first lens surface in a vertical alignment.

Such an optical lens is advantageous if the contact region represents a relatively small and virtually closed-off volume, through which new medium can quickly flow. In this specific embodiment, it is also conceivable to have a pump in an outlet, said pump sucking through new medium, for example from a mixing chamber.

The arrangement according to the invention can be used in all microscopes in which immersion media are used for the image capture. The arrangement is particularly advantageous for laser scanning microscopy and light sheet microscopy, particularly if the illumination beam path and/or the detection beam path are directed or is directed obliquely through the coverslip.

The object is likewise achieved by method for setting optical parameters of a medium acting as an immersion medium. The method comprises the steps of capturing image data of a specimen, arranged in an object space, along a detection beam path, wherein the detection beam path passes through the medium over a portion of its length, said medium being situated in a contact region between an optical lens and a specimen slide, for example a coverslip, and the step of evaluating the captured image data and establishing current image parameters.

The established current image parameters are compared to intended image parameters. The desired mixing ratio of at least two components of the medium is established depending on the comparison. Subsequently, control commands are generated and said control commands are used to actuate a media mixing apparatus for producing the desired mixing ratio in a contact region and/or for producing the desired mixing ratio and supplying the medium into the contact region.

The refractive index of the specimen can be derived as additional information from the desired mixing ratio, the resultant refractive index of the medium set thus and the known refractive index of the specimen holder.

An intended image parameter can be a value, possibly with an admissible tolerance specified. It is also possible that no absolute value or value range is chosen as intended image parameter but that there is an iterative adaptation of the current image parameters, for example. To this end, the quality of an image parameter can be represented by a statistic. A statistic of an established current image parameter is compared to at least one statistic of a previously established current image parameter. By way of example, if a high statistic represents a high quality of the image parameter, the mixing ratio of the medium, for example, can be modified further in one direction until the statistic drops again after a maximum of the statistic has been exceeded. The mixing ratio is selected in such a way that the established maximum is set.

The method comprises establishing a mixing ratio, the effect of which obtains a desired image quality as a result, even if there is no optimized adaptation of the refractive indices of medium and object in this respect.

In a possible configuration of the method, the mixing ratio is set in such a way that a refractive index of the medium, preferably a current refractive index of the medium, is adapted to the refractive index of the object.

The resultant refractive index $n_{res}$ of the medium is preferably selected from a range of $n_{res}$=1.36-1.42, in particular from a range of $n_{res}$=1.36-1.40, in order to obtain an optimized adaptation of the refractive indices of coverslip, specimen medium and medium.

By way of example, image quality parameters such as the image sharpness, the image contrast, the signal-to-noise ratio and/or signal intensities as image parameters can be used as a criterion for establishing the desired mixing ratio.

As explained above, set values or value ranges of an image parameter, for example the image sharpness or contrast, can be intended image parameters. Calibrating the established current image parameters with the intended image parameters defined thus can be considered to be a control loop or feedback control. If a maximum of the statistic of the image parameter is established as an intended image parameter, this is implemented iteratively.

The method can be configured in such a way that the first mixing ratio is set or estimated on the basis of the specimen to be observed and the specimen medium thereof. There can be a comparison with the expected intended image parameter after capturing the image data and establishing the current image parameters. Depending on the direction in which the current image parameters deviate from the intended image parameters, it is possible to establish, for example calculate or gather from a stored table, a mixing ratio to be set next. If the capture and evaluation of the image data is fast enough, it is also possible to drive a gradient of mixing ratios. The current image parameters are captured and evaluated simultaneously therewith. If the currently set mixing ratio comes close to the desired mixing ratio, the change in the mixing ratios can be slowed down in order for it to be stopped when the desired mixing ratio is reached.

In an advantageous configuration of the arrangement according to the invention and of the method according to the invention, the data or results established from the comparison of established current image parameters with intended image parameters are used, additionally or alternatively, for actuating a correction function which is realized in the detection beam path, in particular in an objective. In this way, it is possible to reduce aberrations that may occur on account of the thickness of a coverslip that is present between objective and specimen.

By way of example, the objective is adjustable by means of a correction function. The data of the aforementioned comparison are converted into control commands, by means of which the current optical parameters of the objective are set according to the correction function. By way of example, correction elements of the objective or of optical elements disposed downstream of the objective, for example Alvarez plates, can be set in accordance with the control commands and the correction function. This allows image aberrations such as spherical aberrations and/or differences in the refractive indices to be reduced by means of an adaptation of the resultant refractive index $n_{res}$ while aberrations on account of varying coverslip thicknesses are predominantly produced by means of the correction function of the objective.

The invention advantageously facilitates a significant increase in the imaging quality and/or in the field of use of objectives. Thus, for example, the penetration depth is increased while the imaging quality remains unchanged.

Moreover, a solution in which a refractive index $n_{res}$ of the medium 6 is adapted dynamically, at intervals or when required is significantly more cost-effective than the use and actuation of adaptive optics. Information about the refractive index of the specimen can be obtained as a positive additional effect, and so the arrangement according to the invention can be used as an in situ microrefractometer for biological specimens. It is also possible to store the refractive indices that are set and optimized for a specific specimen and/or for measurements. In this way, a "refractive index map" can be created for subsequent measurements.

In addition to the refractive index, the dispersion of an immersion medium, usually characterized by the Abbe number, is also important for the quality of the microscopic imaging. The prior art has disclosed the practice of primarily adapting the dispersion or the Abbe number of an immersion medium to the coverslip.

The invention renders it possible to also set the dispersion properties of the immersion medium in addition to the refractive index. By way of example, the components $K_1$, $K_2$ to be mixed can be complemented with further components $K_i$, which have different Abbe numbers but equivalent or similar refractive indices. Such a configuration of the invention advantageously also renders it possible to optimize the dispersion of the immersion medium at different used wavelengths. By way of example, this configuration is advantageous if measurements are intended to be undertaken at different wavelengths.

BRIEF DESCRIPTION OF THE DRAWINGS

The invention is explained in more detail below on the basis of exemplary embodiments and figures. In the figures.

DESCRIPTION OF THE EMBODIMENTS

Figure 1B:
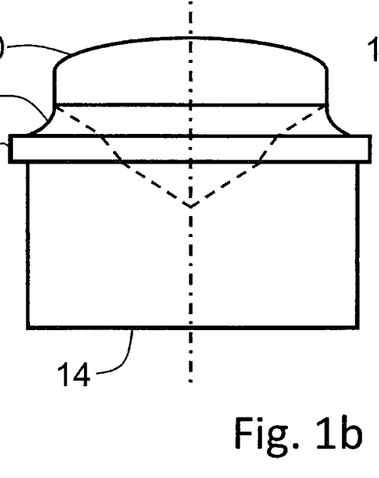
FIG. 1b is a schematic illustration of the prior art of an objective in the form of an immersion objective, a coverslip and a specimen, wherein a medium in the form of an immersion medium is situated between objective and coverslip, wherein aberrations are caused by the coverslip.
Figure 1C:
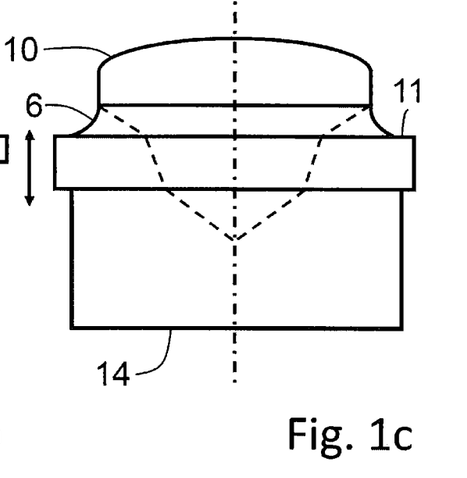
FIG. 1c is a schematic illustration of the prior art of an objective in the form of an immersion objective, a coverslip and a specimen, wherein a medium in the form of an immersion medium is situated between objective and coverslip, wherein aberrations are reduced by means of a correction function.

The elements already described in relation to FIGS. 1a to 1c are also found in further exemplary embodiments. Here, the same reference signs denote the same technical elements.

Figure 2:
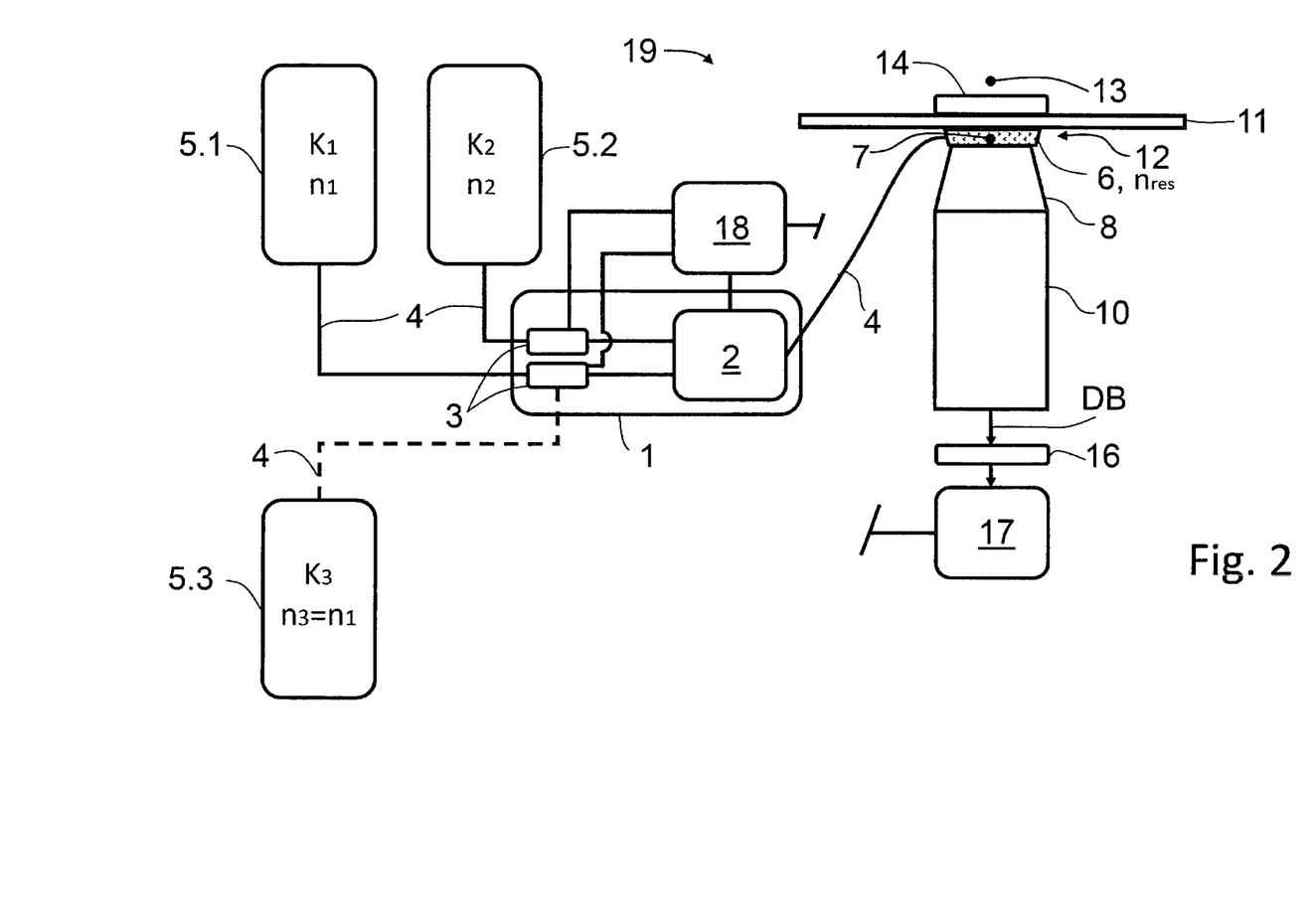
FIG. 2 is a schematic illustration of a first exemplary embodiment of an arrangement according to the invention.

As essential technical elements, an arrangement according to the invention has a media supply unit 1, a mixing apparatus 2, an image capture unit 16, an evaluation unit 17 and a control unit 18 (FIG. 2).

The media supply unit 1 includes a mixing apparatus 2, into which a first component $K_1$ and a second component $K_2$ of a medium 6 can be conveyed by means of pumps 3. The media supply unit 1 is connected to a first storage container 5.1 and a second storage container 5.2 via media lines 4, wherein the first component $K_1$ is stored in the first storage container 5.1 and the second component $K_2$ is stored in the second storage container 5.2. The first component $K_1$ has a refractive index $n_1$ while the second component $K_2$ has a refractive index $n_2$, and the two refractive indices $n_1$ and $n_2$ differ from one another.

Moreover, a third storage container 5.3 is optionally present, the optional use of which is symbolized by a media supply line 4 illustrated using an interrupted solid line. Situated in this third storage container 5.3, there is a third component $K_3$, the refractive index $n_3$ of which equals the refractive index $n_1$ of the first component $K_1$. However, the third component $K_3$ has a different dispersion behaviour in relation to the first component $K_1$ and the second component $K_2$. Controlled admixing of a proportion of the third component $K_3$ and a corresponding reduction in the proportion of the first component $K_1$ allows both the adaptation of the resultant refractive index $n_{res}$ of the medium 6 and an adaptation of the dispersive behaviour of the medium 6.

Further storage containers for storing further components K can be present in further embodiments of the arrangement according to the invention.

The pumps 3 obtain their respective control commands from a control unit 18, the mixing apparatus 2 also being actuatable thereby. The mixing apparatus 2 can be embodied for active mixing of the components $K_1$ and $K_2$ and can contain a sawtooth mixer, for example. As an alternative or in addition thereto, passive mixing can be facilitated by virtue of, for example, a mixing line with turbulators or a Dean flow mixer being part of the mixing apparatus 2.

The ready-mixed media 6 arrives at a contact region 7 via a further media line 4, said contact region being embodied as a gap 12 between an optical lens 8 of an objective 10 and a coverslip that serves as a specimen holder 11. The medium 6 fills the contact region 7 on account of adhesive forces acting between the medium 6 and the surfaces of the optical lens 8 and the specimen holder 11.

A specimen 14 as an object to be observed is arranged, or can be arranged, on the specimen holder 11 in an object space 13.

The objective 10 captures a detection radiation DB (detection beam) arriving from the object space 13 and steers the latter onto the image capture unit 16, which is embodied as a detector with a CCD chip or a CMOS chip, for example.

The detection signals captured thus are output to the evaluation unit 17 as image data. The evaluation unit 17 is configured to establish current image parameters on the basis of captured image data and to compare said current image parameters to intended image parameters. The intended image parameters can be either set values or value ranges, or the intended image parameters are maximized image quality parameters. Depending on the result of the comparison, a desired mixing ratio of the two components $K_1$ and $K_2$ is established in order to obtain a medium 6 with a refractive index $n_{res}$ that results from the desired mixing ratio. The resultant refractive index $n_{res}$ can be calculated in advance since the refractive indices $n_1$ and $n_2$ of the components $K_1$ and $K_2$ are known and their respective proportion in the medium 6 is set by actuating the pumps 3.

In further possible configurations of the method and in further embodiments of an arrangement according to the invention, the evaluation unit 17 is configured to establish current image quality parameters on the basis of captured image data and to maximize said image quality parameters by varying the mixing ratio of the at least two components $K_1$ and $K_2$ in order to obtain a medium 6 with the resultant refractive index $n_{res}$, which is adapted to the best possible extent to a specimen 14.

Control commands are generated for each of the pumps 3 in the control unit 18 and said pumps are actuated accordingly, in accordance with the established desired mixing ratio. According to the desired mixing ratio, the pumps convey volumes of the components $K_1$ and $K_2$ into the mixing apparatus 2, in which said components are mixed together and the medium 6 is produced and provided in the desired mixing ratio. The mixing apparatus 2 is likewise actuated by the control unit 18.

The mixing process can be monitored during the mixing by means of suitable sensors. Here, it is possible to change the actuation of the mixing apparatus 2 and/or of the pumps 3 if the measurement values of the sensors make regulation necessary. Preferably, this regulation is implemented as feedback control. By way of example, monitoring can be implemented by means of a refractometer which analyses the mixture after the mixing apparatus 2.

This medium 6 with the resultant refractive index $n_{res}$ is conveyed, for example pumped, into the contact region 7. Medium 6 that may already be there is completely or partly displaced.

Subsequently, capturing of image data and comparing the current image parameters to the intended image parameters can be carried out again in order to check the correct setting of the resultant refractive index $n_{res}$.

It is also possible that, as a result of a renewed capture of image data and evaluation of the current image parameters, a different mixing ratio than the originally desired mixing ratio is chosen and set as desired mixing ratio. By way of example, changing ambient temperatures, varying air pressures, deviations of the refractive index of the specimen 14 from an expected refractive index and other systematically caused errors may render necessary the selection of a different mixing ratio than would have been selected on account of theoretical considerations and/or empirical data or than was chosen as the starting value.

In the case of a simultaneous observation of the specimen 14 and an evaluation of suitable image parameters, it is possible to minimize aberrations and hence adapt the refractive index $n_{res}$ of the medium 6.

Image quality criteria, in particular, can be evaluated as image parameters.

Since, in particular, optical units with an oblique passage through the specimen holder 11, for example through a coverslip, have strong aberrations in the case of the deviation of the refractive index of the specimen 14 from the refractive index $n_{res}$ of the medium 6, even in the case of an ideally set (coverslip) thickness correction, the image data can be evaluated according to image quality criteria. This applies to all immersion objectives.

Here, the mixing ratio of the components $K_1$ and $K_2$ is varied in order to maximize the chosen image quality criterion. As described above, this can be implemented by selecting a resultant refractive index $n_{res}$ and setting a corresponding desired mixing ratio. It is also possible for a maximized image quality criterion to be approximated iteratively by virtue of the mixing ratio being modified in small steps and the effects of the respective resultant refractive index $n_{res}$ being captured and assessed. The corresponding mixing ratio is maintained if a maximum of the image quality criterion is determined. The found mixing ratio and/or captured intermediate values can be stored and used in subsequent adaptations.

The evaluation can be implemented in automated fashion; to this end, the image quality criteria to be evaluated must be determinable in objective fashion. There are very different image quality parameters that are used in image processing; they can be summarized in the following classes:
  statistical parameters, which are traced back to the histogram of the pixel intensities of an image,
  correlative image quality parameters, which evaluate the autocorrelation of the image, and
  spectral image quality parameters, which evaluate the Fourier spectrum of the image.

Which image quality parameter or parameters is or are best suitable may depend on the specimen and the imaging method. A few image quality parameters are presented below in a purely exemplary manner.

The contrast of an individual, isolated object in front of a uniform background is defined by way of $$C = \Delta S / S'',$$

where $\Delta S$ is the increase or decrease of the signal over the (uniform) background signal S. However, this definition is not suitable for the automated determination of a local image contrast of any sample that is not known a priori. Contrast definitions which calculate the contrast at each pixel of the image or of the ROI (region of interest) are better suited to this end. Additionally, only certain spatial frequency ranges are considered in the Fourier-transformed image, as a result of which signal, background and noise can be isolated better (Peli, Eli., (1990), Contrast in complex images, JOSA A 7.10: 2032-2040).

Thus, the contrast at each pixel and for each frequency band k emerges as $$c_k(x, y) = (B_k(x, y))/\Sigma_{i=0}^{k-1} B_i,$$

where $(B_k(x,y))$ denotes the bandpass-filtered image of the frequency band k and $\Sigma_{i=0}^{k-1} B_i$ contains the energy below this frequency band. The boundaries can be suitably set on the basis of typical microscopy images in Fourier space such that then, for example, a metric is available by way of the mean value of the $c_k(x,y)$ within the image or the ROI, said metric being able to be maximized by adapting the refractive index of the immersion.

A sharpness measure can also be derived from an image in the spatial frequency space (e.g., De, Kanjar, & V. Masilamani, (2013), Image sharpness measure for blurred images in frequency domain, Procedia Engineering 64: 149-158). A threshold is set and the number of spatial frequency components found in the image above this threshold is established. This component, which can serve as a statistic, is at a maximum in the "sharpest" image. Another option consists in evaluating the kurtosis, i.e., the 4th central moment, of the spatial frequency spectrum. By way of example, Zhang, Nien Fan, et al. (1999) (Zhang, Nien Fan, et al. (1999), Image sharpness measurement in the scanning electron microscope—Part III., Scanning 21.4: 246-252) have shown that a low kurtosis correlates with a high sharpness. Further possible image quality parameters are the SNR (signal-to-background ratio) and the intensity of the signal.

In addition or as an alternative thereto, control commands by means of which an objective 10, 10DB is actuated and the current optical parameters thereof are adapted according to a correction function of the objective 10, 10DB can be generated in the control unit 18. Such an adaptation serves, in particular, for the compensation of aberrations that may occur on account of varying thicknesses of the specimen slide 11.

Figure 3:
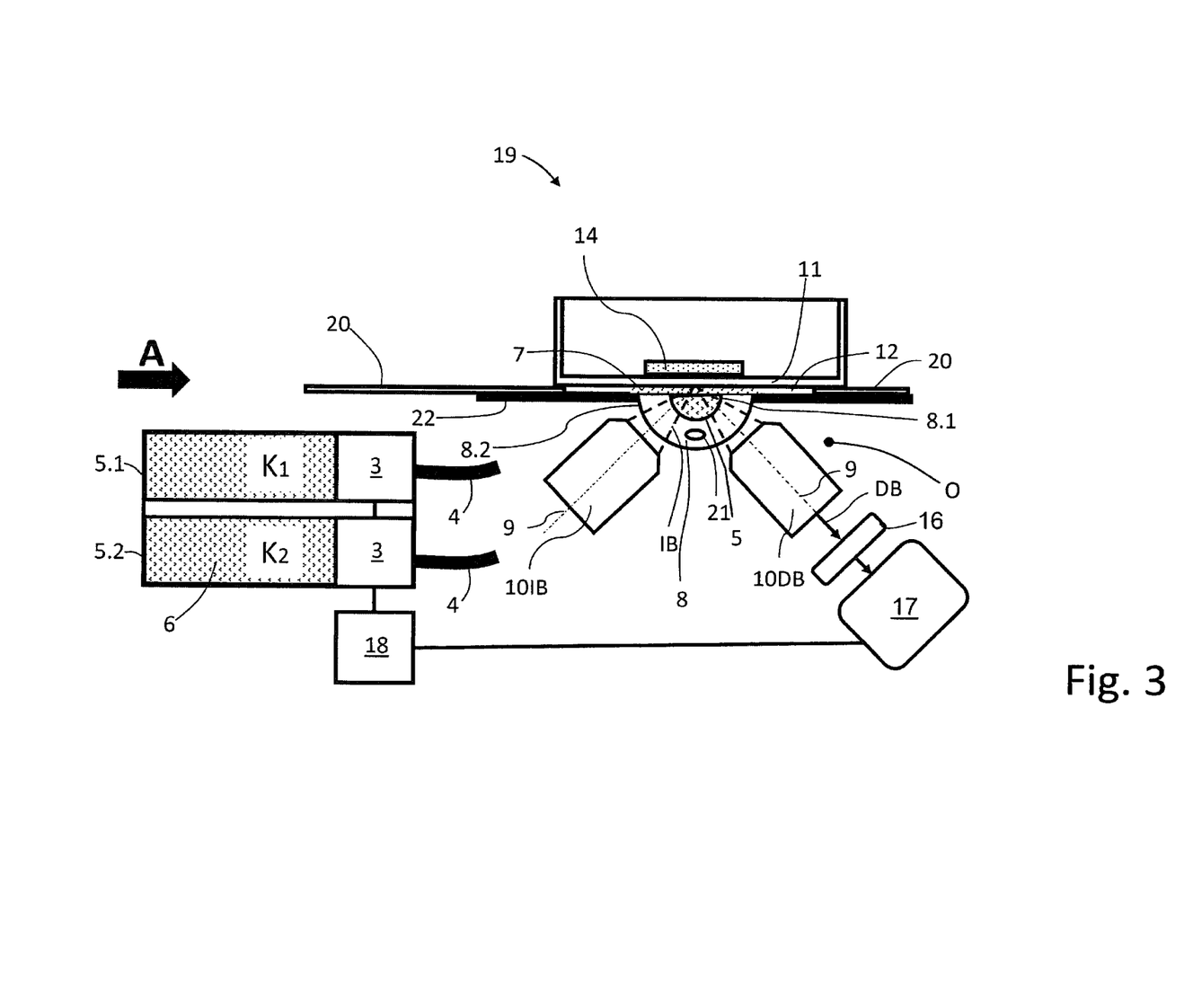
FIG. 3 is a schematic illustration of a second exemplary embodiment of an arrangement according to the invention in a first lateral view.

A further exemplary embodiment of the invention is shown schematically in FIG. 3. The arrangement is a constituent of a microscope 19 not illustrated in any more detail. The optical lens 8 is embodied in the form of a meniscus lens and assigned to a stage 20, advantageously to a controllably displaceable stage 20. The optical lens 8 is sealed by a protective element 22 in the form of a horizontally arranged membrane from an optics space O, in which an illumination objective 10IB for illuminating the specimen 14 and a detection objective 10DB for capturing detection radiation DB (detection beam) are arranged and into which the optical lens 8 protrudes.

A Petri dish as a specimen slide 11 is present on the stage 20, a specimen 14 being placed on the base of said specimen slide. This base is formed by a coverslip that is defined in terms of its thickness and refractive index.

The illumination objective 10IB and the detection objective 10DB, and hence the optical axes 9 thereof, are respectively inclined at an angle of, e.g., 45° in relation to a vertical axis that is shown as a reference axis (interrupted solid line) and directed to a common point of the specimen 14. Here, the two objective axes 9 are orthogonal to one another. The optical lens 8 is situated in the beam paths of illumination objective 10IB and detection objective 10DB, which is shown by the schematic illustration of illumination radiation IB (illumination beam) and a detection radiation DB (detection beam) with interrupted solid lines.

The optical lens 8 has two channels 21, of which the opening of one of the channels 21 that is provided for the connection of two media lines 4 (see FIG. 4) is visible in FIG. 3.

The media lines 4 are each connected to a storage container 5.1 and 5.2, respectively, in which the components $K_1$ and $K_2$, respectively, are contained and can be supplied through the corresponding media line 4 to the contact region 7 by means of respectively one pump 3. The pumps 3 are connected to a control unit 18 and actuatable thereby.

A gap 12 is present between the optical lens 8 and the lower side of the specimen slide 11. It is filled with a medium 6, for example an immersion medium, on account of arising capillary and adhesive forces. The contact region 7 that is filled with the medium 6, the region of the gap 12 below the specimen 14 also being counted as such, forms an optical connection with few or no refractive index differences between the optical lens 8 and the material of the base of the specimen slide 11.

Figure 4:
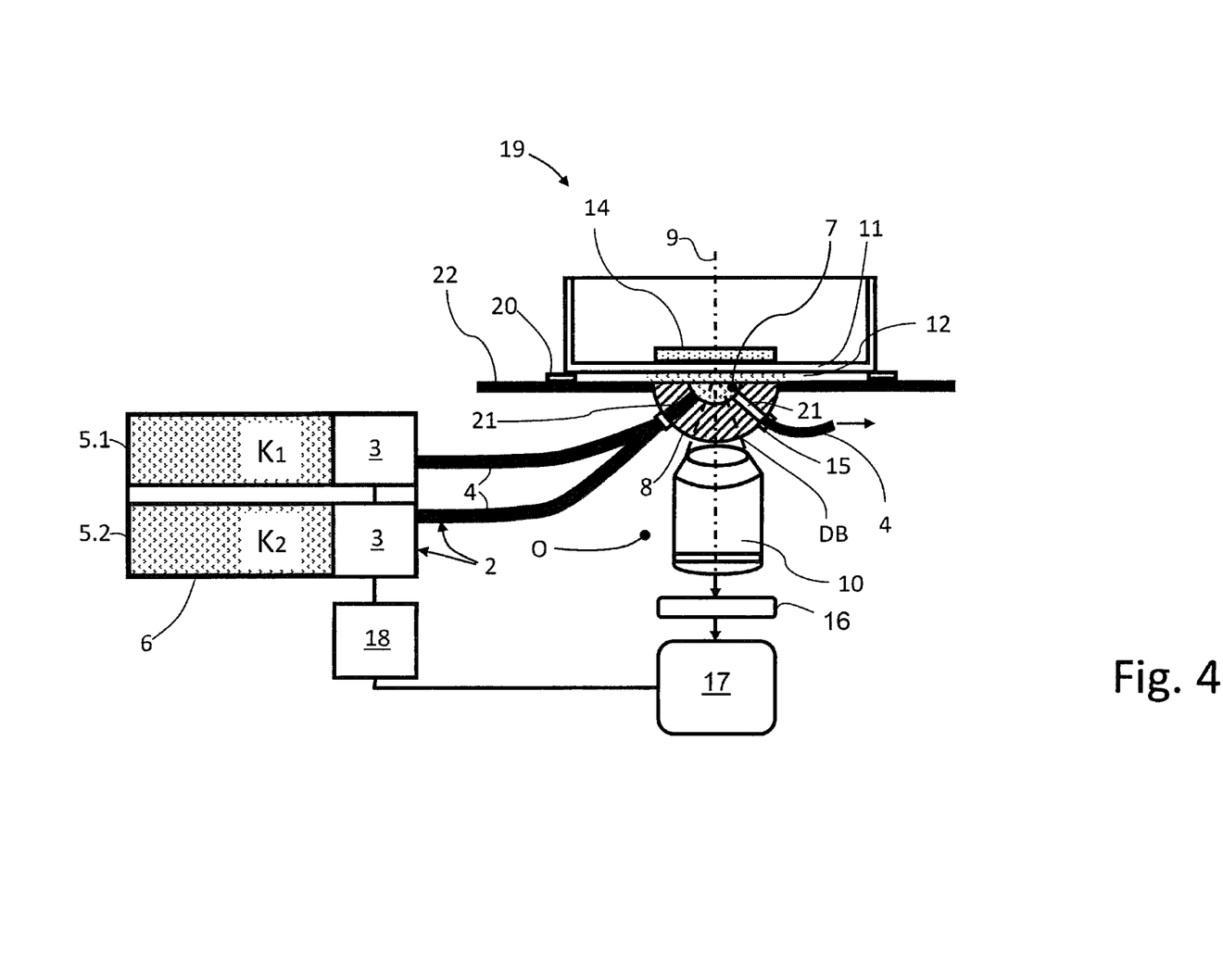
FIG. 4 is a schematic illustration of the second exemplary embodiment of the arrangement according to the invention in a second lateral view.

While there should be high surface tensions of the components $K_1$ and $K_2$ and, in any case, of the medium 6 when forming the contact region 7 as the gap 12 (see FIG. 2) in order to avoid an outflow of the medium 6 from the gap 12, the surface tensions can be lower in an embodiment of the contact region 7 as illustrated in FIGS. 3 and 4.

The arrangement is shown in a second view in FIG. 4, with the direction of view corresponding to the direction of the arrow A from FIG. 3. The storage vessels 5.1 and 5.2, the pumps 3 with the media lines 4 and the control unit 18 are illustrated from the same perspective as in FIG. 3.

In addition to FIG. 3, FIG. 4 shows media lines 4 that are connected to the optical lens 8 (illustrated in a section). The media lines 4 are connected to the optical lens 8 by means of a connector element 15, for example a nozzle with a union nut. The optical lens 8 has a first lens surface 8.1 facing the specimen 14 and a second lens face 8.2 facing away from the specimen 14.

The media lines 4 coming from the storage containers 5.1 and 5.2 are merged before the optical lens 8 and additionally inserted into the channel 21 up to the opening thereof. The other media line 4, which serves to let out the medium 6 from the contact region 7, is only connected to the connector element 15 and held at the optical lens 8. The wall of the channel 21 acts as wall of the media line 4.

In order to operate the arrangement, the first component $K_1$ of the medium 6 is filled into the first storage container 5.1 and the second component $K_2$ of said medium is filled into the second storage container 5.2

By way of example, the components $K_1$ and $K_2$ are selected depending on the properties of the materials of the optical lens 8, of the specimen holder 11 and/or of the specimen 14, or of an embedding medium of the specimen 14 and the employed illumination radiation IB. Moreover, it is possible to take account of optical characteristics of the illumination objective 10IB and/or of the detection objective 10DB. As a consequence of a control command of the control unit 18, the components $K_1$ and $K_2$ are conveyed through the respective media line 4 into the contact region 7 by means of the pumps 3. Depending on the actuation of the pumps 3, the components $K_1$ and $K_2$ are conveyed with certain volumetric flow rates in order to obtain the desired mixing ratio. Here, the proportions of the components $K_1$ and $K_2$ can be set in a range from 0 to 100%.

As a consequence of merging the media lines 4 before the optical lens 8, the mixing process already starts in the media line 4 between the merging location and the contact region 7. In conjunction with the pumps 3, the media lines 4 act as mixing apparatus 2. The contact region 7 is filled with the already slightly mixed components $K_1$ and $K_2$. A medium 6 that may already be present in the contact region 7 is displaced and replaced by the supplied components $K_1$ and $K_2$. The mixing process of the components $K_1$ and $K_2$ is completed when filling the contact region 7 and the medium 6 with the resultant refractive index $n_{res}$ is obtained.

It is also possible only to change the proportion of one of the components $K_1$ or $K_2$ in the medium 6 present in the contact region 7 by virtue of only supplying a certain amount of the relevant component $K_1$ or $K_2$. Mixing of the medium 6 with the supplied proportion of the components $K_1$ and $K_2$ is implemented passively in the contact region 7, for example as a result of flow effects and/or density differences.

Subsequently, the specimen 14 can be observed and imaged by virtue of the selected illumination radiation IB being radiated into the specimen 14 through a used region of the optical lens 8, in which no channel 21 is formed, and through the medium 6 situated in the contact region 7 and the base of the specimen holder 11 by means of the illumination objective 10IB. Detection radiation DB, coming from the specimen 14, in the form of reflected components of the illumination radiation IB and/or radiation excited by means of the illumination radiation IB, such as fluorescence radiation, are captured by means of the detection objective 10DB and supplied to the image capture unit 16, and image data are evaluated by the evaluation unit 17, as described above.

Once the specimen examination has been completed, the medium 6 can be replaced by new medium 6 or by a purge medium. The consumed medium 6, in this case the immersion medium, leaves the contact region 7 through the second channel 21 and it is guided into a collection or waste reservoir (not shown), for example.

It is also possible that the suitability of the currently present refractive index $n_{res}$ of the medium 6 is monitored and adapted where required on the basis of the image data and the evaluated image quality parameters already during the specimen examination. To this end, use is preferably made of a so-called feedback control.

In further embodiments of the arrangement, the pumps 3 are actuated by means of the control unit 18 in such a way that the medium 6 in the contact region 7 is replaced at intervals or continuously. By way of example, corresponding therewith, the feedback control is implemented at intervals or continuously.

Figure 5:
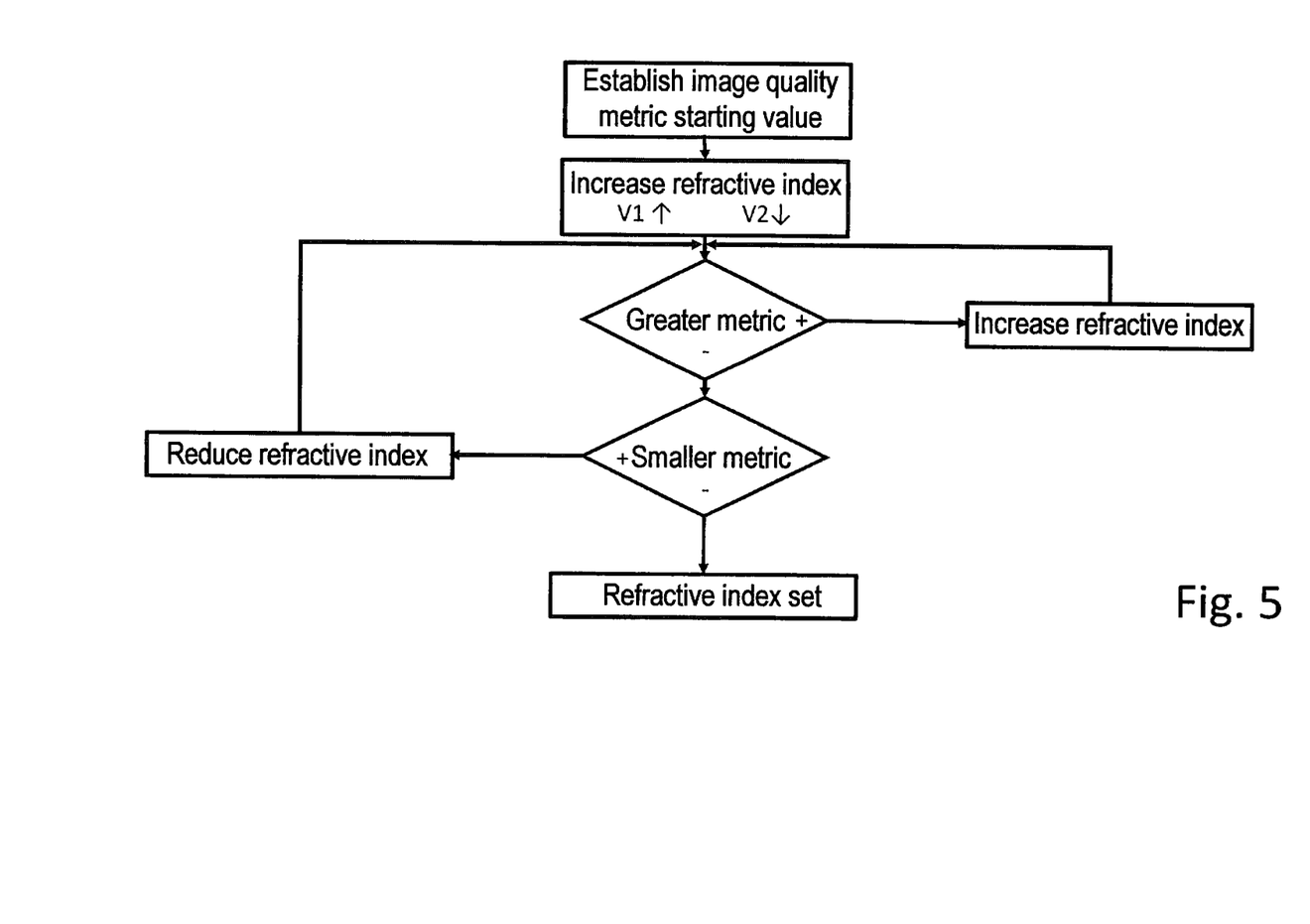
FIG. 5 is a schematic illustration of a flowchart of a configuration of the method according to the invention.

The method already described above on the basis of the arrangement according to FIG. 2 is shown once again in FIG. 5 as a flowchart. An image quality parameter (image quality metric, metric) is selected and set as a start value on the basis of the known parameters of the employed microscope 19 or of illumination objective 10IB, detection objective 10DB, specimen holder 11, specimen 14, embedding medium, illumination radiation and/or the image capture unit 16. After evaluating the current image parameters, the evaluation unit 17 sets whether an adaptation of the refractive index $n_{res}$ of the medium 6 is required. Should an adaptation be necessary, the desired mixing ratio at which the desired refractive index $n_{res}$ is obtained is established, for example calculated. The proportions of the components $K_1$ and $K_2$ in the medium 6 are thereupon modified accordingly (symbolized by the signs V1↑ and V2↓).

The mixing ratio can also be established iteratively. By way of example, a corresponding theoretital starting value is chosen if the assumption is made that water is the specimen medium (specimen 14, see above). The resultant refractive index $n_{res}$ is increased proceeding therefrom since a deviation of the actual refractive index in this direction is expected to be most likely. If an improved image quality parameter is determined on account of the adapted mixing ratio, the mixing ratio is increased further until a stagnation or an initial decrease of the image quality parameter occurs. The resultant refractive index $n_{res}$ is set when the currently selected mixing ratio leads to a maximum image quality parameter.

In further configurations of the method, it is also possible to estimate shortly to be required adaptations of the refractive index $n_{res}$ on the basis of simulation and/or tables. Then, the required steps for adapting the refractive index $n_{res}$ can already be introduced before there is a reduction in the image quality.

It is possible to increase the refractive index $n_{res}$ should, for example, the current image parameters being greater than the intended image parameters be determined in a subsequent evaluation step. By way of a subsequent renewed evaluation, the effect of the adaptation of the refractive index $n_{res}$ is assessed and, where required, newly adapted, for example increased or else reduced.

An analogous procedure is adopted if the evaluation shows that the current image parameter is smaller than the intended image parameter.

Setting the refractive index $n_{res}$ is completed if no deviation of the current image parameter from the intended image parameter is determinable or if this deviation is smaller than a predetermined admissible deviation. Optionally, a renewed evaluation of current image parameters can be undertaken at regular intervals and/or should a change in the operating conditions occur, for example in the case of changes in temperature, pressure conditions, etc.

A combination of setting the refractive index $n_{res}$ and controlling an appropriately configured objective 10, 10DB on the basis of the correction function is possible with all the aforementioned configurations of the method according to the invention.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1 Media supply unit
2 Mixing apparatus
3 Pump
4 Media line
5.1 First storage container
5.2 Second storage container
5.3 Third storage container
6 Medium
7 Contact region
8 Optical lens
8.1 First lens surface
8.2 Second lens surface
9 Optical axis (Objective 10, 10IB, 10DB)
10 Objective
10IB Illumination objective
10DB Detection objective
11 Specimen slide
12 Gap
13 Object space
14 Specimen
15 Connector element
16 Image capture unit
17 Evaluation unit
18 Control unit
19 Microscope
20 Stage
21 Channel
22 Protective element
DB Detection radiation
IB Illumination radiation
$K_1$ First component
$K_2$ Second component
$K_3$ Third component
$n_1$ Refractive index (of the first component $K_1$)
$n_2$ Refractive index (of the second component $K_2$)
$n_3$ Refractive index (of the third component $K_3$)
$n_{res}$ Resultant refractive index (of the medium 6)
O Optics space

What is claimed is:

1. Arrangement for supplying media that serve as immersion media, said arrangement comprising:
a media supply unit comprising a mixing apparatus and pumps connected to the mixing apparatus for conveying components of a medium to the mixing apparatus, said media supply controlling for the controlled supply of a medium or of a mixture into a contact region between an optical lens and a specimen slide, on which a specimen may be arranged in an object space,
an image capture unit arranged on a detection beam path for capturing image data on the basis of detection radiation obtained from the object space along a detection beam path extending through the contact region, an said evaluation unit being connected to the image capture unit and having a feedback loop and sensors for capturing a currently set mixing ratio of the components, said evaluation unit configured to establish current image parameters on the basis of captured image data, to compare said current image parameters to intended image parameters and to establish a desired mixing ratio of at least two components of the medium depending on the comparison, a mixing apparatus for controlled setting of the mixing ratio of the components of the medium to be introduced into the contact region, and a control unit, which is connected to the mixing apparatus as well as to the pumps and is configured to actuate the mixing apparatus depending on the established desired mixing ratio.

2. Arrangement according to claim 1, wherein said mixing apparatus is a sawtooth mixer, a Dean flow mixer or a mixing line.

3. Arrangement according to claim 1, wherein the optical lens has a first lens surface and a second lens surface, wherein the first lens surface faces a specimen to be observed and the second lens surface faces away from the specimen to be observed, and the optical lens has at least one channel opening at the contact region, and the channel extends through the optical lens.

4. Arrangement according to claim 3, wherein said at least one channel opens up away from a highest point of the first lens surface in a vertical alignment.

5. Method for setting optical parameters of a medium acting as an immersion medium, comprising:

capturing image data of a specimen arranged in an object space along a detection beam path, wherein the detection beam path passes through the medium over a portion of its length;

evaluating the captured image data and establishing current image parameters;

comparing the current image parameters to intended image parameters and establishing a desired mixing ratio of at least two components of the medium depending on the comparison; and generating control commands and actuating a mixing apparatus for producing the desired mixing ratio in a contact region between the optical lens and a specimen slide on which a specimen may be arranged in an object space, and/or for producing the desired mixing ratio and supplying the medium into the contact region.

6. Method according to claim 5, further comprising establishing a maximum of an image quality parameter iteratively as intended image parameter.

7. Method according to claim 5 wherein the mixing ratio is set in such a way that a resultant refractive index of the medium is matched to a refractive index of the specimen.

8. Method according to claim 7, wherein the refractive index of the medium is, selected from a range of 1.36-1.42, and in particular from a range of 1.36-1.40.

9. Method according to claim 5, wherein the image quality parameters of image sharpness, image contrast, a signal-to-noise ratio and/or signal intensities are used as image parameters.

10. Method according to claim 5, further comprising generating control commands depending on the result of the comparison of the current image parameters with the intended image parameters and a correction function of the objective is set using these control commands.

* * * * *

UNITED STATES PATENT AND TRADEMARK OFFICE
CERTIFICATE OF CORRECTION

PATENT NO. : 10,649,194 B2
APPLICATION NO. : 16/142979
DATED : May 12, 2020
INVENTOR(S) : Thomas Kalkbrenner, Sebastian Borck and Jörg Siebenmorgen Page 1 of 1

It is certified that error appears in the above-identified patent and that said Letters Patent is hereby corrected as shown below:

In the Specification

Column 8, Line 26: now reads: "K can be present in further embodiments of the arrangement"
should read -- $K_i$ can be present in further embodiments of the arrangement --

Column 10, Line 21: now reads: "$C=\Delta S/S"$,"
should read -- $C=\Delta S/S'$, --

In the Claims

Column 16, Line 21: now reads: "index of the medium is, selected from a range of 1.36-1.42,"
should read -- index of the medium is selected from a range of 1.36-1.42, --

Signed and Sealed this
First Day of September, 2020

Andrei Iancu
*Director of the United States Patent and Trademark Office*